No. 796,076. PATENTED AUG. 1, 1905.
J. S. KEMP.
JOURNAL BEARING.
APPLICATION FILED OCT. 20, 1902.
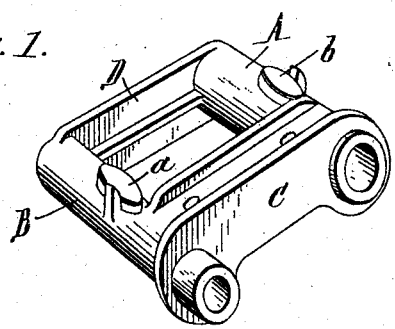
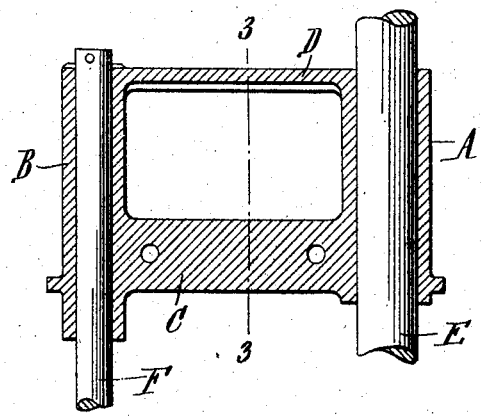
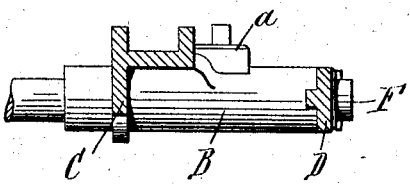
Witnesses:—
R. W. Rumer.
E. A. Volk.
Joseph S. Kemp, Inventor
by Wilhelm & Bonner
Attorneys.

UNITED STATES PATENT OFFICE.

JOSEPH SARGENT KEMP, OF NEWARK VALLEY, NEW YORK.

JOURNAL-BEARING.

No. 796,076.　　　　Specification of Letters Patent.　　　　Patented Aug. 1, 1905.

Application filed October 20, 1902. Serial No. 127,969.

*To all whom it may concern:*

Be it known that I, JOSEPH SARGENT KEMP, a citizen of the United States, and a resident of Newark Valley, in the county of Tioga and State of New York, have invented a new and useful Improvement in Journal-Bearings, of which the following is a specification.

This invention has special reference to that class of journal-bearings which are used in fertilizer-distributers or manure-spreaders for supporting the rear axle and the clutch or counter-shaft of the beater-drive.

The object of the invention is to provide a simple and strong bearing in which the rotating parts are rigidly supported.

In the accompanying drawings, Figure 1 is a perspective view of the improved bearing. Fig. 2 is a horizontal sectional view of the bearing. Fig. 3 is a vertical section in line 3 3, Fig. 2, looking rearward.

Like letters of reference refer to like parts in the several figures.

The bearing comprises two parallel tubular bearings and two longitudinal braces or connections which connect, respectively, the outer and inner or the front and rear ends of these tubular bearings and form therewith a frame having two opposite tubular members.

A and B represent the parallel tubular bearings, C the front or outer brace, connection, or bracket, and D the rear or inner connection or brace. These bearings are made of the proper diameter and length to receive the shafts which they are designed to support. When used in a manure-spreader or fertilizer-distributer, the bearing A is of the proper diameter to receive the rear axle E and the bearing B is of the proper diameter to receive the counter-shaft F, on which the clutch mechanism of the beater-drive is mounted and which is somewhat smaller in diameter than the axle.

When used in a manure-spreader, the front connection C is of such size and form as to form a bracket by which the bearing can be secured to the under side of the side sill of the body or box, and the inner or rear brace or connection D is arranged parallel with the front connection or bracket C.

The tubular bearings A B are preferably provided with oil-cups $a$ $b$, respectively. This duplex bearing, consisting of the two tubular journal-bearings and the two connections, forms a four-sided frame which is extremely rigid and holds both bearings securely in parallelism, while being comparatively light. The springing of the bearings, and particularly that of the rear-axle bearing, resulting from the severe strains to which the rear axle is at times exposed, is thereby entirely avoided.

I claim as my invention—

A duplex journal-bearing consisting of two parallel tubular bearings, a front brace connecting the front ends of said bearings, and a rear brace connecting the rear ends of said bearings, the whole forming a rigid frame of which the tubular bearings form two opposite members, substantially as set forth.

Witness my hand this 6th day of October, 1902.

JOSEPH SARGENT KEMP.

Witnesses:
　JENNIE E. ELWELL,
　MARY ELWELL.